United States Patent [19]
Mueller

[11] Patent Number: 5,496,000
[45] Date of Patent: Mar. 5, 1996

[54] SYSTEM FOR STORING AND TRANSPORTING FOOD AND BEVERAGES ON BOARD OF AIRCRAFT

[75] Inventor: Hans-Juergen Mueller, Henstedt-Ulzburg, Germany

[73] Assignee: Daimler-Benz Aerospace Airbus GmbH, Hamburg, Germany

[21] Appl. No.: 189,880

[22] Filed: Feb. 1, 1994

[30] Foreign Application Priority Data

Feb. 1, 1993 [DE] Germany ................... 4302706

[51] Int. Cl.⁶ .................................................. B64D 11/04
[52] U.S. Cl. .................... 244/118.1; 244/118.5; 244/137.1; 198/465.3; 104/88.01
[58] Field of Search ................. 244/118.1, 118.5, 244/137.1, 137.2; 105/327; 414/392, 399, 282; 186/40, 51; 198/465.1, 465.2, 465.3; 104/88

[56] References Cited

U.S. PATENT DOCUMENTS 4,660,787  4/1987  Sprenger et al. .
5,074,496  12/1991  Rezag et al. .................... 244/118.5
5,163,806  11/1992  Robertson et al. ............... 244/137.1
5,205,515  4/1993  Luria ............................ 244/118.5
5,314,143  5/1994  Luria ............................ 244/118.1
5,322,244  6/1994  Dallman et al. ................. 244/118.1

FOREIGN PATENT DOCUMENTS

4029628  10/1991  Germany ............................ 244/118.5

*Primary Examiner*—Galen L. Barefoot
*Attorney, Agent, or Firm*—W. G. Fasse; W. F. Fasse

[57] ABSTRACT

A system for storing and transporting food and beverages on board of an aircraft is equipped with a centrally arranged container having the configuration of a freight container for holding menu boxes and beverage boxes with at least one distribution station or pantry, and with a transport channel that communicates with the container and the pantry. The transport channel includes at least one vertical conveyor so that the container may be placed on a lower freight deck while the pantry is positioned on the passenger deck. Such a system can handle more menu and beverage boxes of standardized sizes than trolley based systems without sacrificing space for passenger seats.

27 Claims, 12 Drawing Sheets

SYSTEM FOR STORING AND TRANSPORTING FOOD AND BEVERAGES ON BOARD OF AIRCRAFT

FIELD OF THE INVENTION

The invention relates to a system for handling, specifically storing, transporting, and distributing foods and beverages on board of an aircraft. The system includes at least one storage container and a transport channel for conveying foods and beverages in standardized boxes to a distribution station from the container.

BACKGROUND INFORMATION

Conventional systems for handling foods and beverages on board of an aircraft comprise food carrying trolleys which are filled up on the ground, by standardized menu packages containing foods and beverage packages. These containers are stored in these trolleys which in turn are brought on board prior to departure. On board galleys are equipped with parking positions for these trolleys. The transport of the menu boxes which hold the food, to the individual passengers then takes place with these trolleys along the aisles of the aircraft. The number of boxes storable in the trolleys on board an aircraft is limited by the available parking space for these trolleys in the respective galley area. In order to conventionally increase the storage space in the galley areas, it is necessary, especially in aircraft that carry several hundred passengers, to provide additional parking places for the trolleys with the result that the number of passenger seats must be reduced. This is undesirable.

Furthermore, menu and beverage boxes employed for use in conventional trolleys are not reusable, thereby increasing the problems of garbage removal and disposal.

It is also known to store food to be taken on board, in lower deck areas of the aircraft. Thus, for example, German Patent Publication (DE-PS) 3,245,986 corresponding to U.S. Pat. No. 4,660,787 (Sprenger et al.) issued on Apr. 28, 1987 discloses a food supply system for aircraft comprising at least one pantry cabinet on the passenger deck and a substantial number of supply carts or trolleys on a lower deck below the passenger deck. The known system also includes at least one lifting mechanism such as an elevator for the trolleys, arranged between the pantry cabinet on the passenger deck and the lower deck. The supply trolleys on the lower deck are kept on a platform positioned below the pantry cabinet. In an alternative construction according to the above mentioned U.S. Patent the trolleys are movable on the lower deck by a conveying system positioned below the pantry cabinet so that the supply trolleys are removable from the platform in a selectable manner by the lifting mechanism.

In the known system the supply trolleys must be brought individually on board and placed into the respective parking positions on the platform. When a meal is to be served, the individual trolleys are brought into the kitchen area of the cabin by the above mentioned elevator to make the food ready for distribution to the passengers. This distribution also takes place by pushing the trolleys along the aisles past the individual seating rows. Such a system has the disadvantage that the loading and unloading of the trolleys is quite time consuming and that the arrangement of the platform and of the lifting mechanism or elevator requires a substantial space relative to the quantity of food and beverages that may be handled by such a system. In other words, the space factor relating the sum of the box volumes holding food and beverages to the total volume required for the supply system is not efficient due to the quite bulky trolleys and distribution system components.

OBJECTS OF THE INVENTION

In view of the foregoing it is the aim of the invention to achieve the following objects singly or in combination:

to construct a system of the type described above in such a way that the number of passenger seats may even be increased with a corresponding increase of the number of menu and beverage boxes by improving the space factor;

to reduce the time for the loading and unloading of the menu and beverage boxes while simultaneously reducing the volume of garbage by making these boxes reusable; and to provide a food and beverage supply system for an aircraft which is easily adaptable to different requirements of different types of aircraft by avoiding the transport of trolleys from one deck to another in an aircraft.

SUMMARY OF THE INVENTION

The food and beverage storage and supply system according to the invention, for an aircraft, comprises substantially a centrally arranged container having an outer configuration corresponding to that of a freight container for holding menu and beverage boxes. The system further includes at least one pantry or distribution station and a transport channel between the container and the distribution station. If necessary, the transfer of boxes from the container to the transport channel and from the channel to the trolleys in the pantry may be performed manually or automatically as will be described below. Such a system has the advantage that it permits increasing the number of boxes while substantially reducing the number of distribution trolleys without sacrificing any passenger seats.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
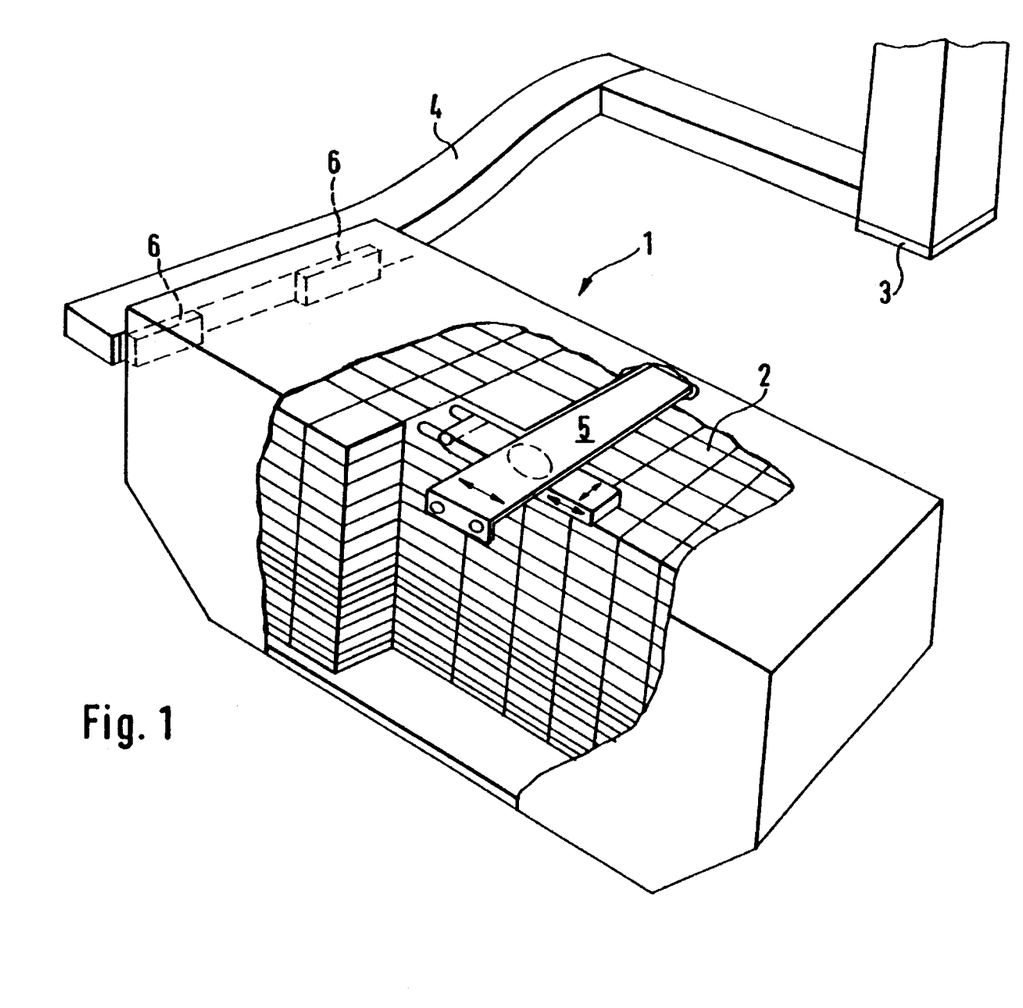
FIG. 1 is a perspective view of a food and beverages handling system according to the invention including a storage container, a transport channel, and a pantry.

FIG. 1 shows a system for handling food and beverages on board of an aircraft comprising substantially a container for holding menu boxes 2 and a distribution station 3 linked to each other through a transport channel 4. The container 1 has the outer dimensions and configurations of a conventional freight container which may be stored as a unit below the passenger deck, for example, in a cargo hold of the aircraft. Contrary to conventional freight containers, however, the container 1 according to the invention is equipped on its inside with a controllable box unloading mechanism 5. The transport channel 4 comprises individual channel components or sections that can be assembled in various configurations which are easily adapted to local requirements as may be dictated by different aircraft types. For introducing the individual menu boxes 2 into the transport channel 4 the latter is equipped with two input feeder units or sections 6 to be described in more detail below with reference to FIG. 10.

Figure 2:
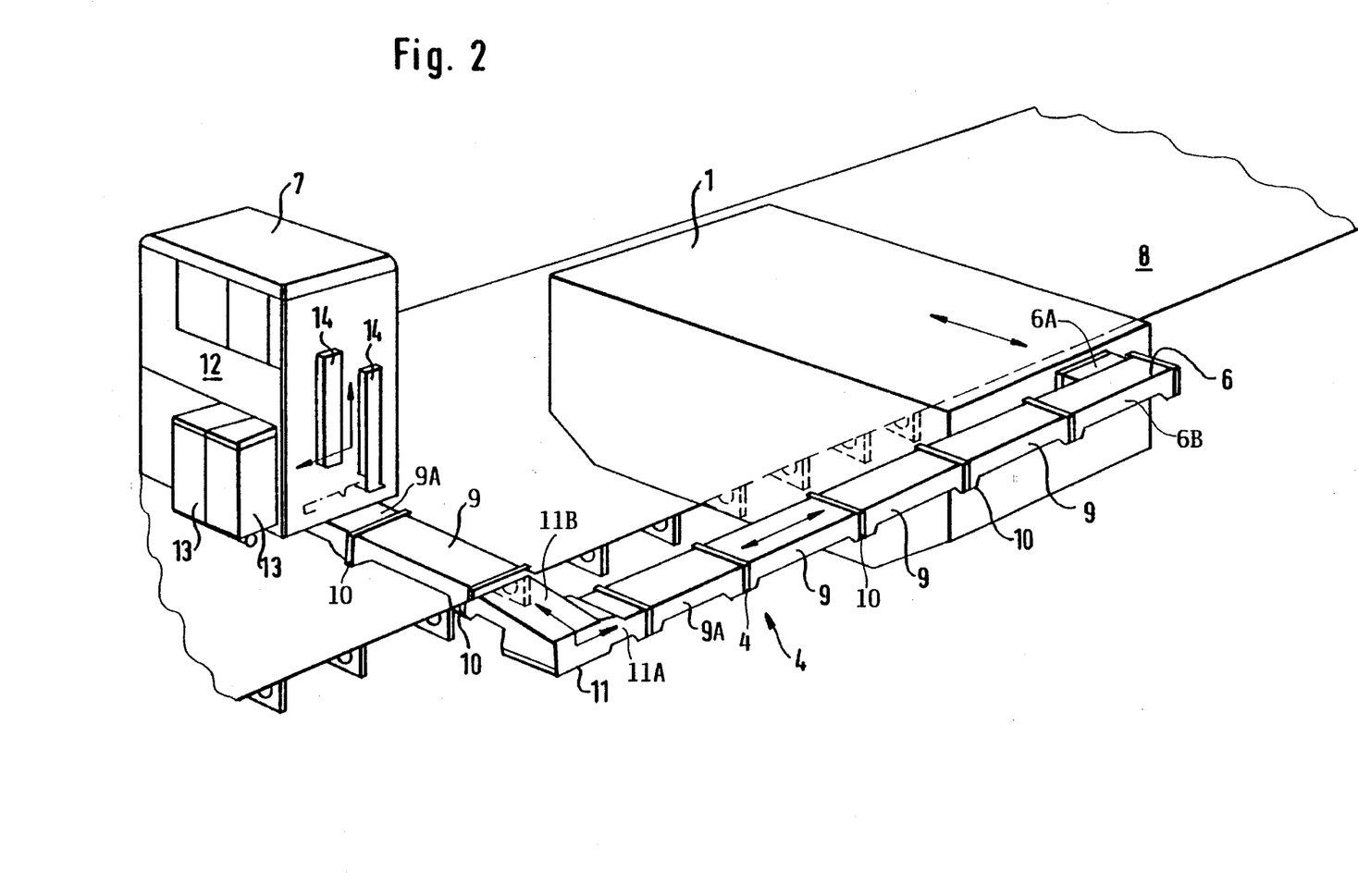
FIG. 2 is a perspective view of the system components above a main deck and below a main deck.

FIG. 2 shows a perspective overview illustrating the cooperation of the transport channel with a distribution station 7, also referred to as a pantry or galley 7, positioned on a passenger deck 8, and a container 1 according to the invention positioned below the deck 8. An input feeder unit 6 of the channel 4 connects the channel 4 to the container 1. The channel 4 comprises a plurality of individual structural channel sections 9 which are flanged to one another at 10. The channel 4 is preferably a substantially flat channel, i.e. it is less high than it is wide. The feeder unit 6 in FIG. 2 forms an elbow with one section 6A leading into the container 1 and another section 6B connected to a row of channel sections or components 9, all of which are flanged together at a plurality of flanges 10. The chain of channel sections 9 extends in the direction of the longitudinal aircraft axis until the last section 9A is connected to an elbow component 11 having one section 11A connected to the longitudinal channel portion and another section 11B connected to a component 9 leading crosswise of the aircraft cabin floor toward the pantry 7. The last section 9A forms a channel link 9A connecting the crosswise extending channel section 9 to the pantry 7. The pantry comprises a work surface 12 and a plurality of trolleys 13 positioned on defined parking spots below the work surface 12. In these positions the trolleys 13 are ready to be filled with boxes 2. For this purpose feeder units 14 are provided in the pantry for transferring boxes from the channel link 9A into the trolleys 13. The feeder units 14 can withdraw from link 9A the boxes coming from the container 1 through the transport channel 4, and place these boxes into the trolleys 13. The filled trolleys are ready for use by the flight attendants.

Figure 3:
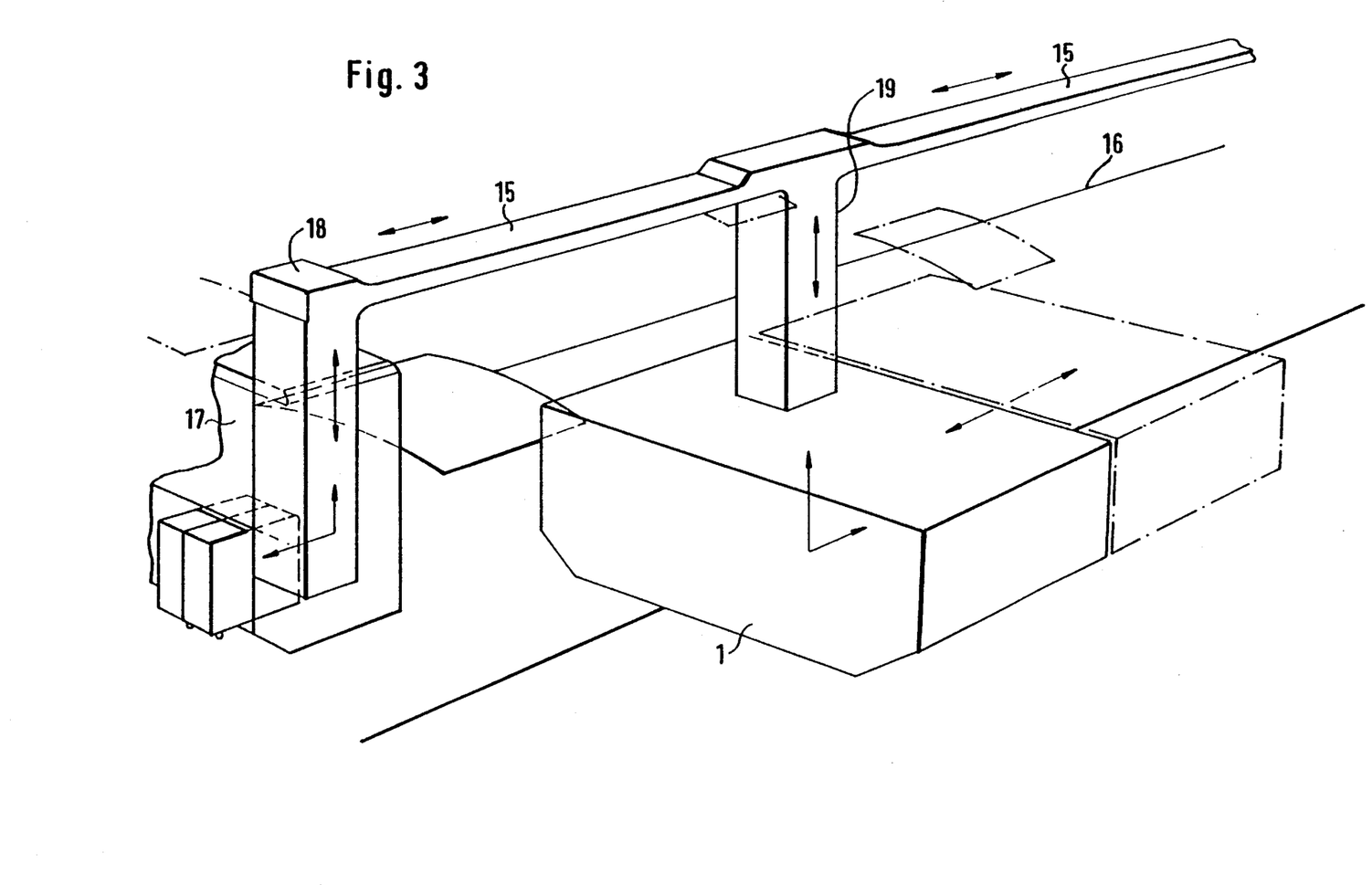
FIG. 3 is a perspective view with a differently arranged food handling channel capable of transporting food in opposite directions.

FIG. 3 shows an embodiment of a modified transport channel 15 which is arranged above the deck 16, but reaches through the deck 16 into any one of a plurality of containers 1. The channel 15 communicates with a container through a vertical conveyor 19 and with the distribution station 17 through a further vertical conveyor 18.

Figure 4:
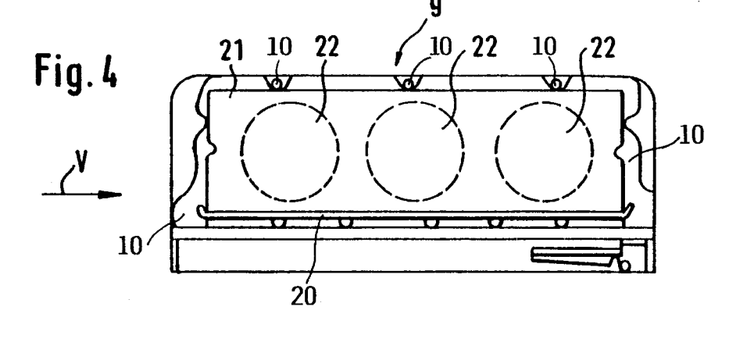
FIG. 4 illustrates a sectional view through a food transport channel.

FIG. 4 shows a sectional view through one structural channel component or link 9 with an endless conveyor belt 20 carrying a beverage box 21 filled with three beverage containers 22. The beverage containers, such as bottles, are oriented horizontally with their longitudinal axis in the box 21. Thus, the bottles or containers 22 extend with their longitudinal axis in the travel direction of the conveyor belt 20.

Figure 5:
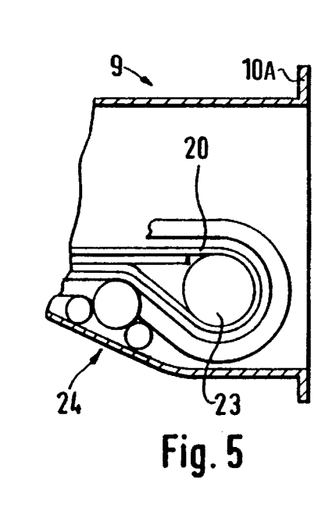
FIG. 5 illustrates a partial view, on an enlarged scale, in the direction of the arrow V in FIG. 4.

FIG. 5 shows a partial view in the direction of the arrow V in FIG. 4 to illustrate the right-hand end of the conveyor belt 20 in the channel link 9 showing that the endless belt 20 runs around a roller 23 which may be a roller driven by an electric motor. The housing of the link or section 9 is provided with end flanges 10A for connection to corresponding flanges of neighboring links 9. A group of rollers 24 is so positioned in the housing of the link 9 that the belt 20 is guided around the roller 23 and then the spacing between the upper and lower runs of the belt 20 is optimally reduced. As a result, it is possible to reduce the cross-sectional area of the housing of the links or sections 9, thereby reducing the total volume needed for the transport channel. The positioning of the rollers 23 and 24 at the opposite end of the housing of the link 9 is mirror-symmetrical to the arrangement shown in FIG. 5. At least one of the two rollers 23 in each link 9 is a driven roller as mentioned, whereby an electric motor is preferably used for that purpose.

Figure 6:
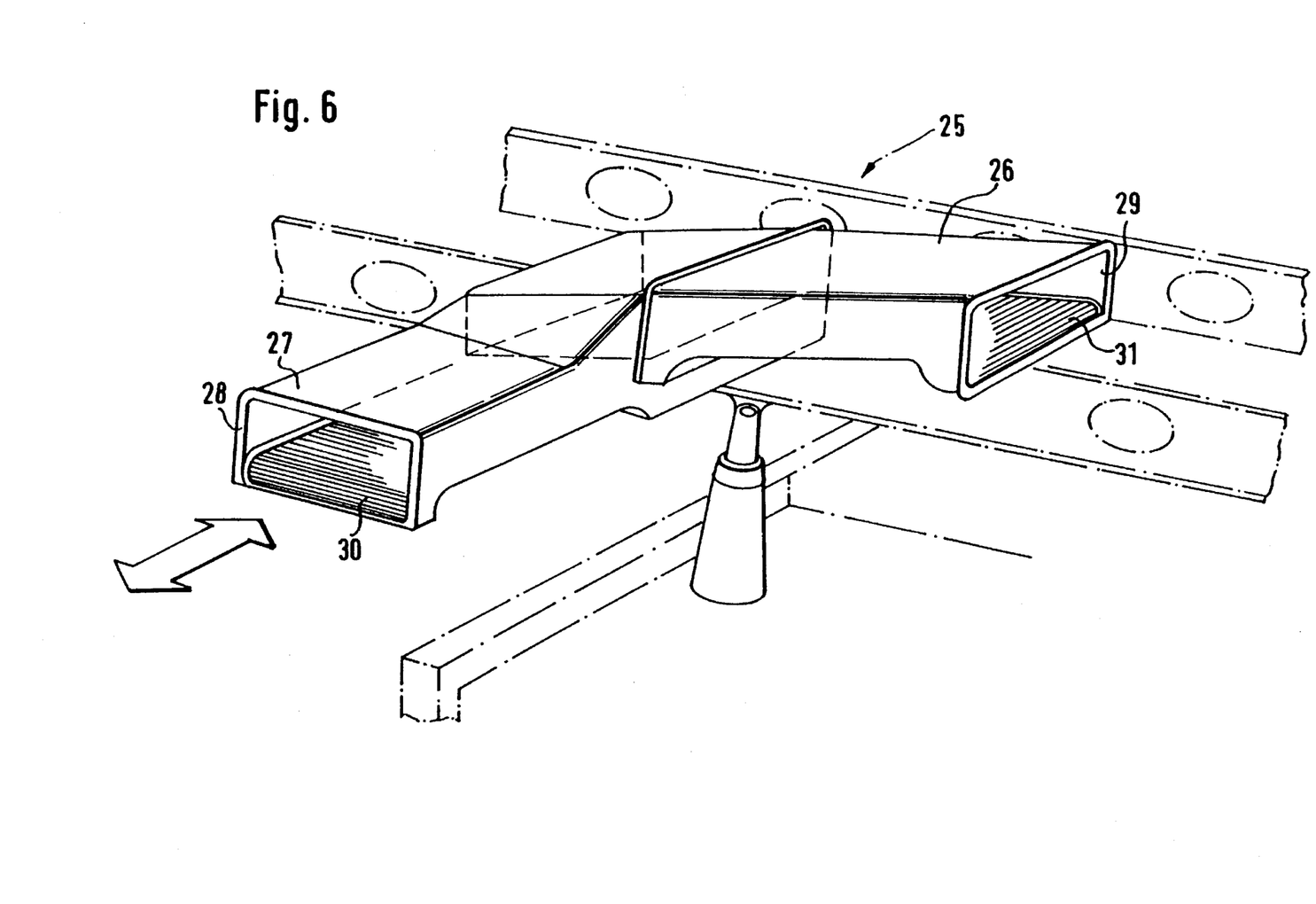
FIG. 6 is a perspective view of an angular transport channel component or elbow section forming part of the food transport channel.

FIG. 6 illustrates an elbow construction of a channel section 25 to connect a cross-channel 26 to longitudinal channel 27. Conveyor belts 30 and 31 are symbolically shown at the entrance 27 and 29 respectively, to the elbow section 25 of the channel system.

Figure 7:
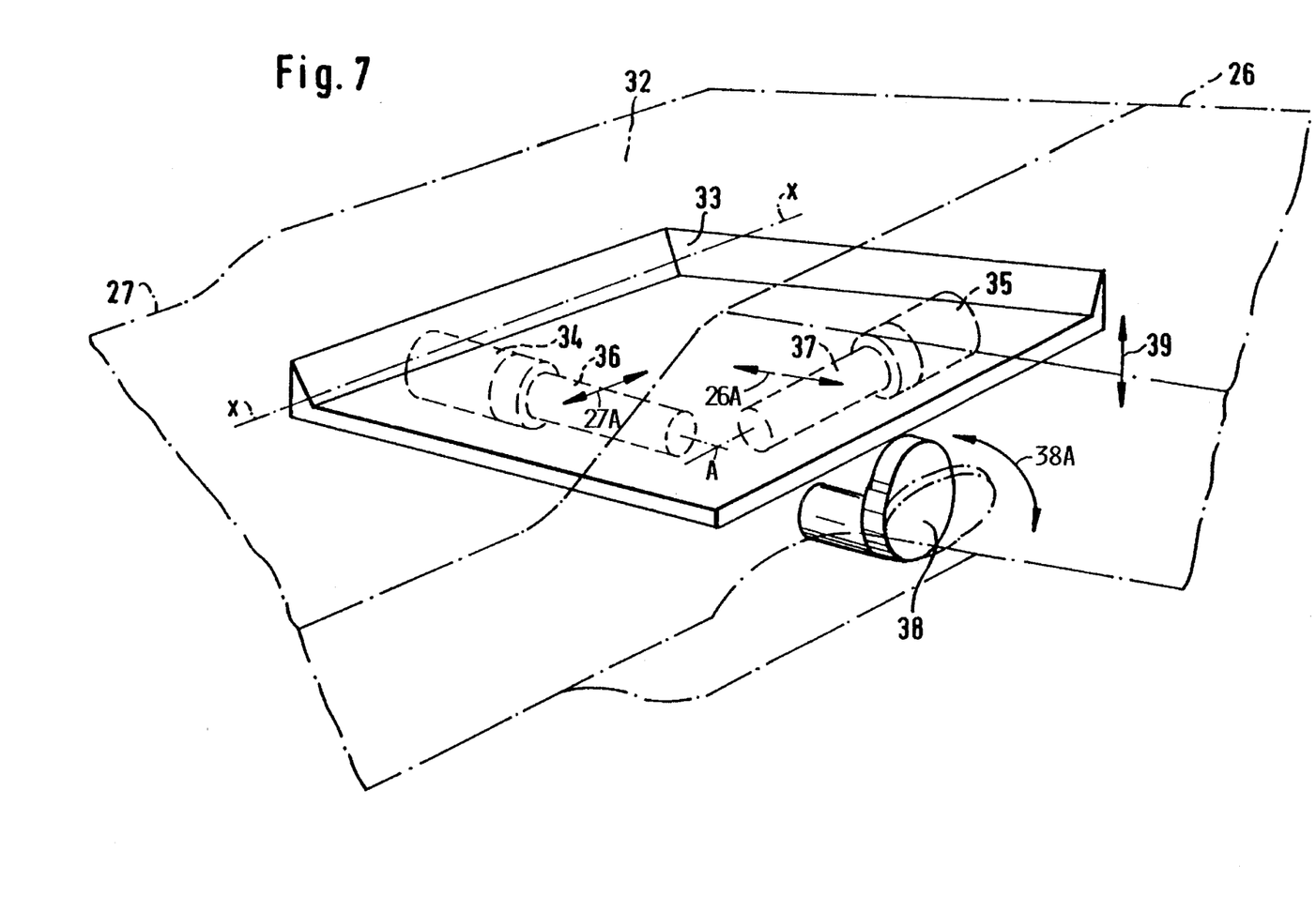
FIG. 7 shows on an enlarged scale a perspective view of further details of the angular elbow section of the transport channel of FIG. 6.

FIG. 7 shows further details of elbow section 25 of FIG. 6 for interconnecting the cross channel 26 with the longitudinal channel 27, whereby both channels 26 and 27 merge into a common elbow housing 32. A tiltable platform 33 is tiltably mounted in the housing 32 for tilting about the axis X—X. Two conveyor motors 34 and 35 driving conveyor rollers 36 and 37 respectively are so arranged below or in the tiltable platform 33 that the rotational axes of the rollers 36 and 37 intersect at A substantially or approximately at a right angle. The tiltable platform 33 can be lifted and lowered by a respective driven member 38 such as an eccentric cam or the like movable as indicated by the arrow 38A for raising or lowering the platform 33 as indicated by the arrow 39. If now a menu box 2 arriving, for example, in the longitudinal channel 27 is to be transferred through the elbow section 25 into the cross channel 26, the tilting platform 33 is lowered by operating the member 38 and the feed advance motor 34 is switched on for a time duration sufficient for the box 2 to be fully received on the tiltable platform 33. Then the platform 33 is lifted again until the lower edge of the menu box 2 is at the same level as the feed advance belt 31 shown in FIG. 6. Thereafter, the motor 35 is switched on so that the menu box 2 leaves the housing 32 in the direction of the cross channel 26. The two double arrows 26A and 27A indicate that it is possible to transfer a package in one or the other direction, whereby the motors 34 and 35 will respectively be driven in one or the other direction.

Figure 8:
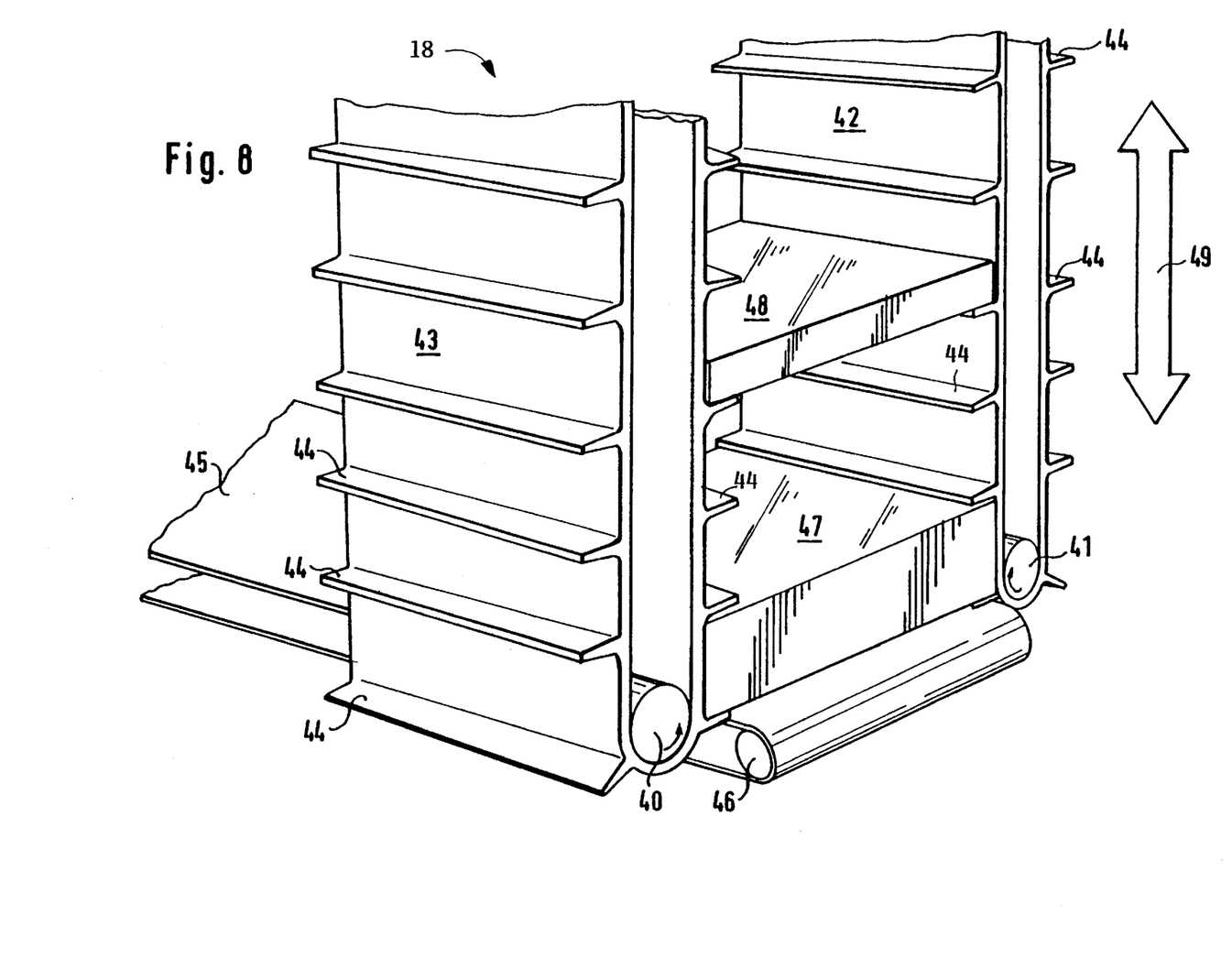
FIG. 8 shows a partial perspective view of a vertical elevator or lift that forms part of the present transport channel.

FIG. 8 shows the portion of the vertical conveyor 18 also shown in FIG. 3. The vertical conveyor 18 comprises conveyor rollers 40 and 41 for driving and/or guiding endless vertical conveyor belts 42 and 43 equipped with shelves 44 which extend perpendicularly to the plane of the respective belts 42 and 43 and crosswise to the width of the belts. Two additional rollers, not shown, are positioned vertically above the rollers 40 and 41 to support the endless belts 42 and 43. A horizontal conveyor 45 supported and driven by rollers 46 is positioned to cooperate with the vertical conveyor 18 for transferring a package or box such as a beverage box 47 from the conveyor 45 into the grooves between two neighboring shelves 44 of the vertical conveyor 18. Menu boxes 48 can be transferred in the same manner. The endless belts 42, 43 are driven by the rollers 40 and 41 in synchronism, however in opposite directions. For example, roller 41 is rotated clockwise while roller 40 is rotated counterclockwise as shown by respective arrows so that the inwardly facing runs of the belts 42 and 43 move either upwardly or downwardly in unison while the respective outer runs move downwardly or upwardly respectively as indicated by the double arrow 49. The horizontal width of the conveyor belt 45 is preferably slightly smaller than the respective dimension of the boxes 47, 48 so that the belt 45 does not interfere with the shelves 44 as they travel past the edges of the belt 45. Smaller boxes as shown in FIG. 9 can be handled by a tray type box 68 shown in FIG. 15.

Figure 9:
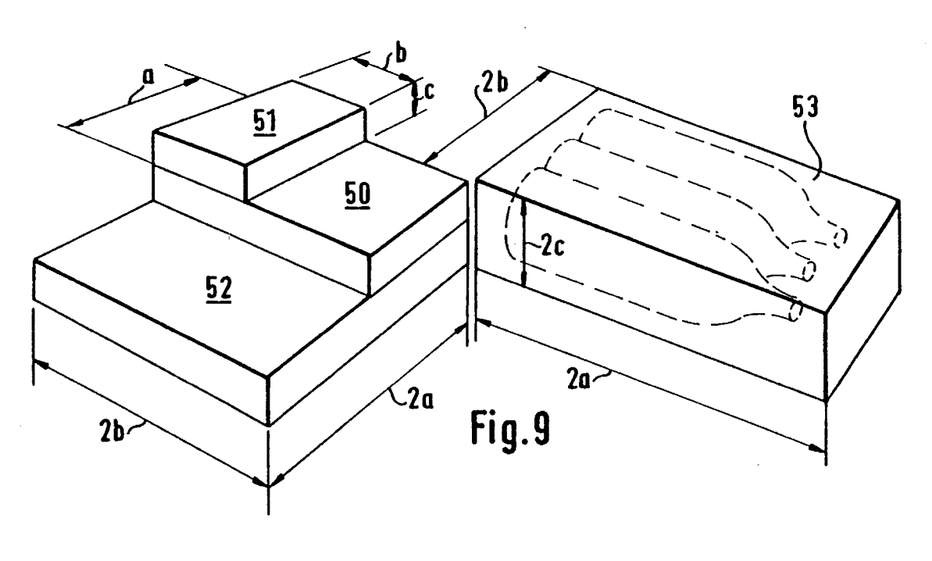
FIG. 9 shows example embodiments of food and beverage containing boxes of various standardized sizes.

FIG. 9 illustrates perspectively the various standardized sizes of boxes used in the present system. The boxes 50, 51, and 52 are menu boxes. The box 53 is a beverage box. The beverage box is dimensioned to hold maximally three normal champagne or wine bottles of, for example of 0.75 liters each. Instead, the box 53 can hold fourteen beverage cans, each holding 0.33 liters. The dimensions a, b, and c are so selected that the largest box is twice as large as the next smaller box and so forth. Thus, the volume of the box 52 fits twice into the volume of the box 53. Similarly, the volume of the box 50 fits twice into the volume of the box 52. The spacing between the conveyor belt runs facing each other in FIG. 8 is preferably so selected that the dimension 2×a can be received between the belt surfaces and so that the respective shelves 44 can engage the edges of the respective box. The vertical spacing between the shelves 44 is so selected that it can accommodate the dimension 2×c so that the largest box can be transported and so that the smaller boxes can rest on a larger box to form a packet of several boxes for transportation or in a tray type box 68. Furthermore, as seen especially in conjunction with FIG. 13 described below, the standardized boxes are preferably dimensioned to fit horizontally into the receiving shelves or slots of standardized food service trolleys.

Figure 10:
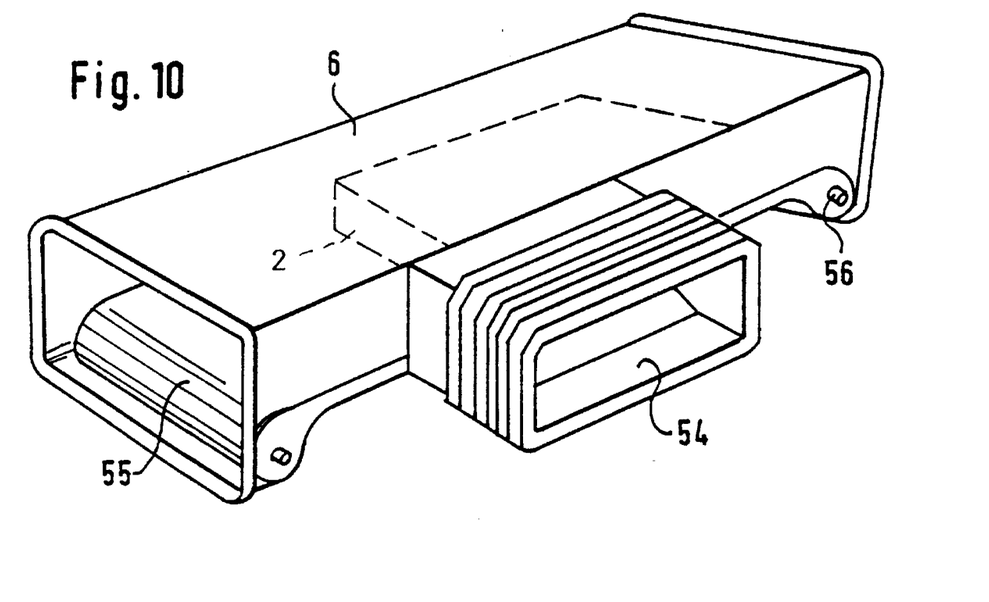
FIG. 10 is a perspective view of an input or feeder unit for inserting boxes into the transport channel.

FIG. 10 shows in more detail the feeder section 6 that also appears in FIG. 1. The feeder section 6 receives a menu box 2 or beverage box 53 from the robot 5 in the container through the inlet 54. The box is pushed onto a conveyor belt 55 driven by a drive shaft 56 and supported at its end by rollers as shown in FIG. 5, for example. The rotation of drive shaft 56 is reversible for moving the belt 55 in one or the other direction. The inlet 54 is preferably a hollow bellows to easily adapt to the respective opening in the container 1.

Figure 11:
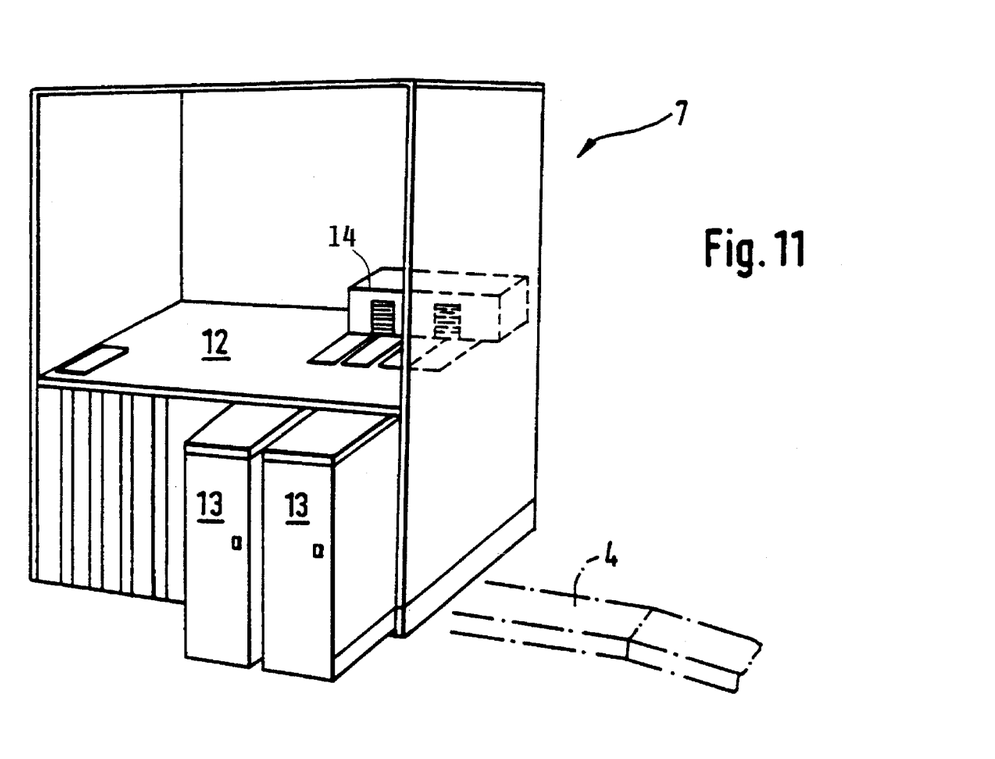
FIG. 11 is a perspective view of a pantry according to the invention.

FIG. 11 shows the galley or pantry 7 with its work surface 12 above the trolleys 13. Since it is no longer necessary to transport food into the pantry 7 by exchanging entire trolleys, it is also no longer necessary to position the pantry 7 next to large body doors of the aircraft. This is a substantial advantage of the invention because the pantry 7 can now be positioned substantially anywhere within the passenger cabin of the aircraft. Such positioning is possible because the installation of the transport channel 4 can be accomplished substantially anywhere in the aircraft body including the passenger cabin.

Figure 12:
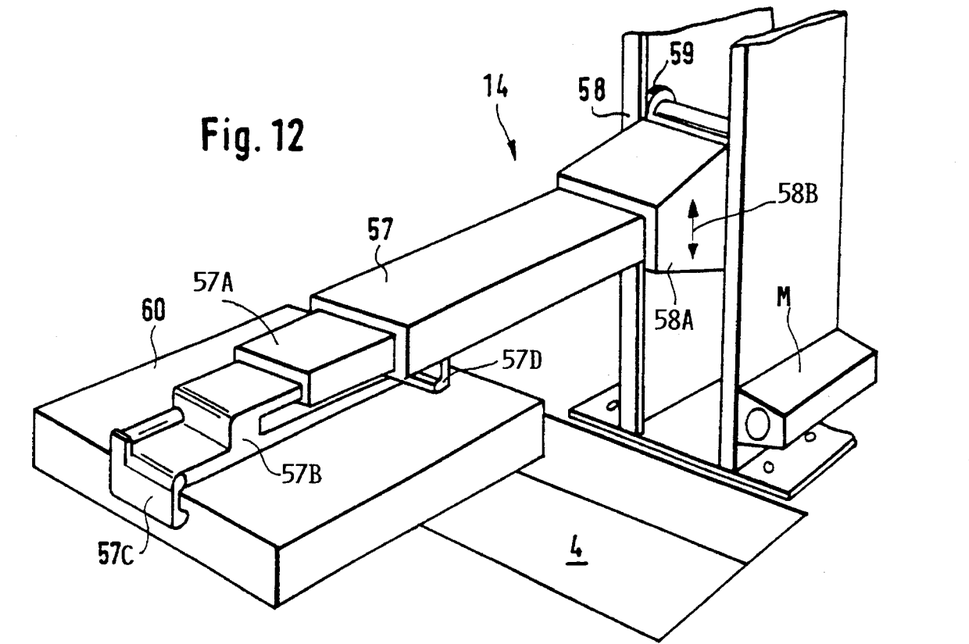
FIG. 12 is a perspective view of a robot arm for retrieving menu or beverage boxes from the transport channel and inserting these boxes in a trolley.

FIG. 12 illustrates a transfer unit 14 also symbolically shown in FIG. 1. The transfer unit 14 comprises a vertical shaft type housing 58 in which a carriage 58A is supported for a vertical and guided up and down movement as indicated by the arrow 58B. A drive motor M drives the carriage 58A for the vertical up and down movement. The carriage has wheels 59 that are guided in a track in the housing 58. The carriage supports a horizontally extending telescoping arm 57 with telescoping sections 57A and 57B carrying a gripper 57C and a thumb 57D. The gripper 57C and thumb 57D are so dimensioned that they can grip a box 60 coming along the transport channel 4, but cannot disturb a box forming the top of a stack in the trolley 13. In other words, the grippers 57C and the thumb 57D have a vertical dimension somewhat less than the vertical depth of the box 60. For picking up a box from the channel 4, the carriage 58A is moved downwardly and the telescoping arm 57 is moved inwardly so that the gripper 57C and the thumb 57D can pick up a box 60 that rests, for example, on a lifting platform 62, 63 in the last upwardly open channel section 9A shown in FIGS. 2 and 13. Once a box has been gripped, the carriage 58A is moved upwardly to a level where the arm 57 can horizontally extend into the trolley 13 at a level just above the last box inserted or if the first box is involved, to a level just above the bottom of the trolley.

Figure 13:
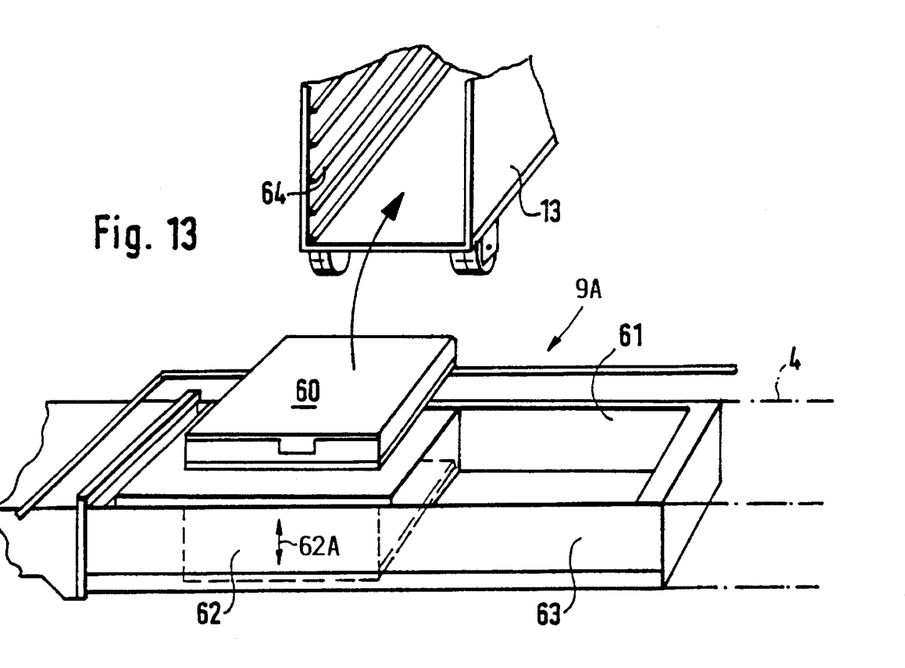
FIG. 13 is a perspective view of a structural component of the transport channel for presenting menu or beverage boxes to the robot arm of FIG. 12 for insertion into a trolley.

FIG. 13 shows a lifting unit 61 of the channel section 9A which forms part of the transport channel 4. FIG. 13 shows further details for the transfer of boxes 60 from the channel section 9A leading into the pantry 7 from the transfer channel 4. A lifting unit 61 includes two lifting platforms 62 and 63 each capable of lifting a box 60 coming out of the channel 4. The respective lifting platform 62 or 63 raises the box 60 as indicated by the arrow 62A to a level for proper gripping by the gripper 57C and the thumb 57D. The carriage 58A and the telescoping arm 57 then position the package at the proper level for insertion into the trolley 13 so that these packages are supported by shelves 64 arranged on the vertical inner surfaces of the trolley walls to form respective shelves for holding the boxes 60. Conventional mechanisms lift the platforms 62 or 63 one at a time.

Figure 14:
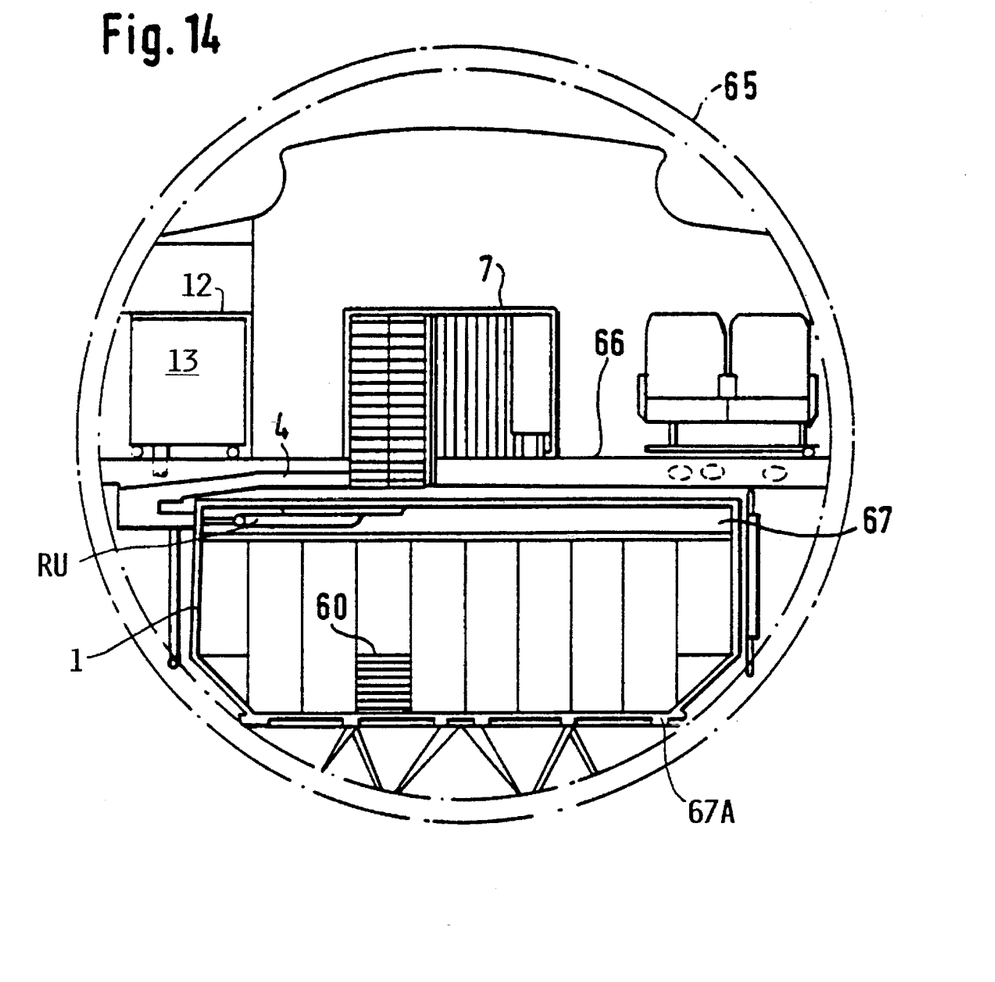
FIG. 14 is a sectional view in the direction of the longitudinal aircraft axis showing the arrangement of the components of a handling system for foods and beverages according to the invention.

FIG. 14 shows a cross-section through an aircraft body 65 of a passenger aircraft having a cabin floor 66 on which the pantry 7 is positioned. One trolley 13 is seen below the work surface 12. A container 1 holding menu boxes 60 is arranged on the freight floor 67A in a cargo hold 67 below the floor or deck 66. The individual boxes 60 are retrieved from the container 1 by a robot unit RU which places the individual boxes 60 into a feeder inlet 54 of the channel unit 6 as shown in FIG. 10. The boxes are then transported inside the channel 4 by conveyor belts as shown in FIGS. 4 and 5 and into the pantry 7 as described. In the pantry the boxes are retrieved from the channel by the unit 14 and inserted into the trolley or trolleys 13 also as described.

Figure 15:
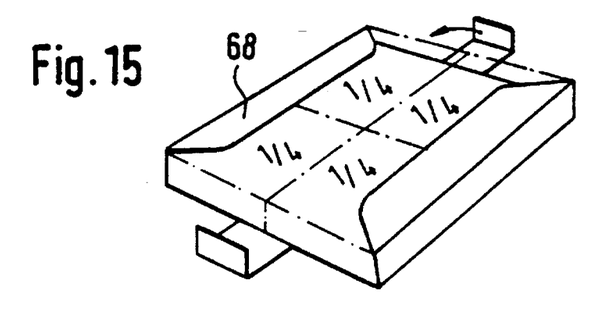
FIG. 15 shows a tray type plate used in the present system for holding smaller than a certain standard size.

FIG. 15 shows a tray type box 68 for holding a plurality of smaller menu boxes, for example, quarter-size menu boxes shown at 51 in FIG. 9. The tray type box 68 is so dimensioned that its volume will correspond to a standard box that will fit between the shelves 44 in FIG. 8.

Figure 16:
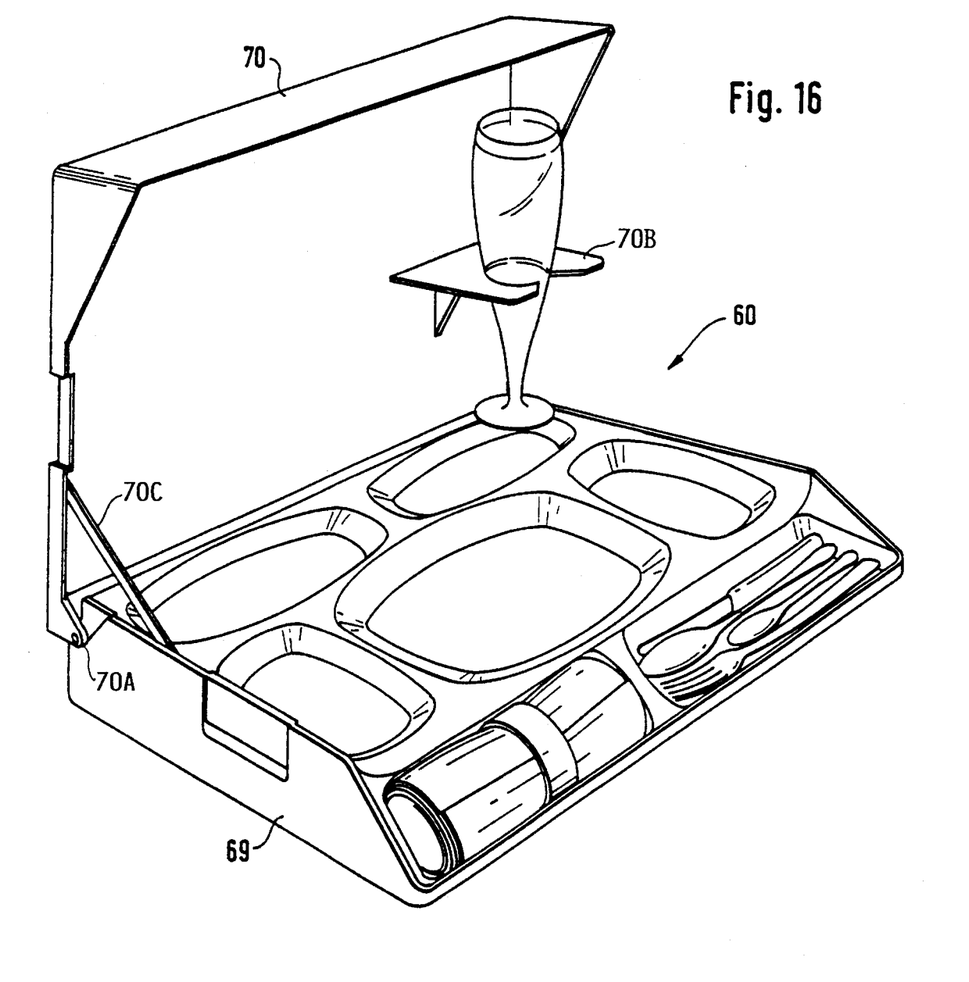
FIG. 16 shows a perspective view of a menu box according to the invention.

FIG. 16 shows a menu box 60 according to the invention having a bottom section 69 and a top section 70 hinged to the bottom section, for example at 70A. Preferably, these boxes are made of sufficiently strong synthetic plastic material so that these boxes can be reused. The boxes are so sized that one box can hold all the food items, cutlery, napkins and the like for a meal. A glass holder 70B is secured to the inside of the cover 70, preferably in a foldable manner. The menu box 60 is preferably constructed as a double walled box to keep heated foods warm. A brace 70C that is foldable out of the way is provided to hold the cover 70 in the shown upright position. The box 60 is preferably provided with a clasp to keep the box normally closed. Such a clasp can be easily opened by the passenger once the box has been delivered at the passenger seat. It is further preferable to provide these menu boxes with a safety feature that keeps these boxes in the container 1 in a fixed location against possible mass forces. Such a safety feature can only be released by the unloading mechanism or when empty boxes are conveyed back into the container 1 the safety feature may be switched on again by the loading mechanism.

Figure 17:
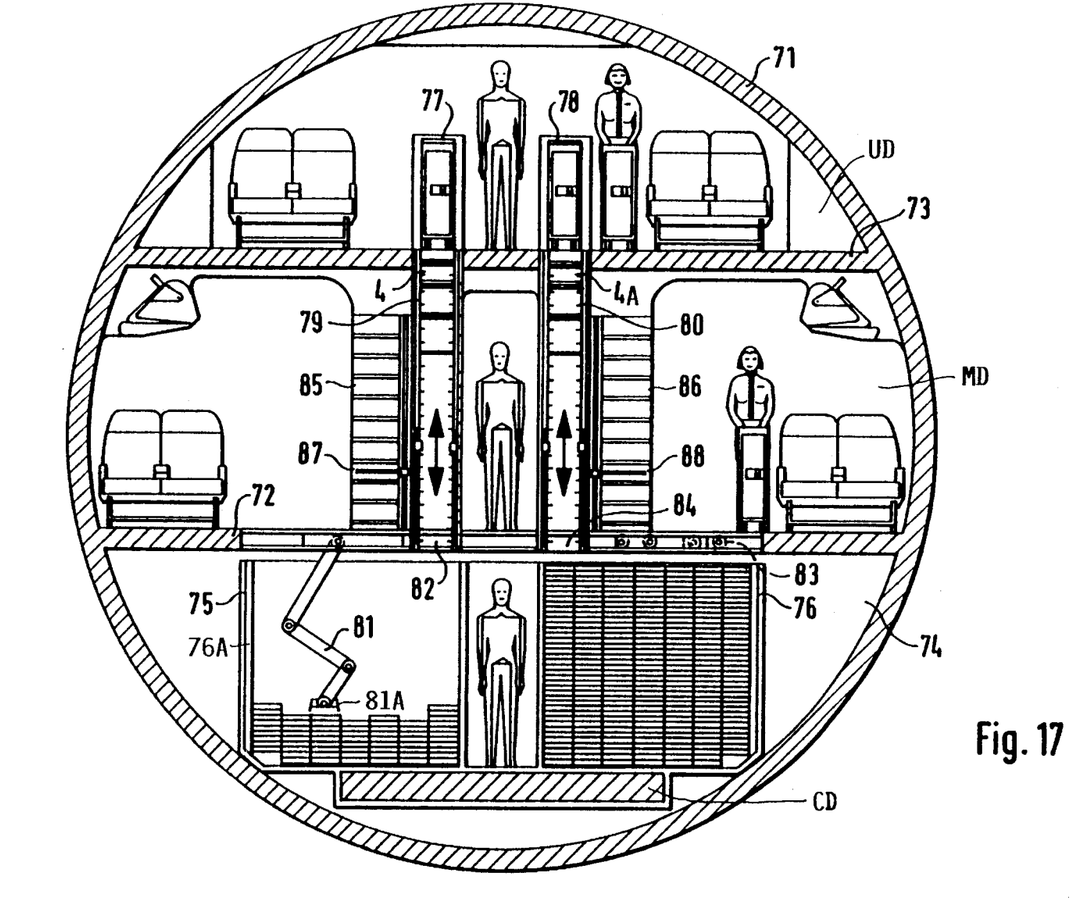
FIG. 17 shows a sectional view similar to that of FIG. 14, but illustrating a different embodiment of a food and beverage handling system according to the invention in an aircraft with two decks.

FIG. 17 shows a cross-section perpendicularly to the longitudinal aircraft axis through an aircraft body with a cargo deck CD, a main deck MD, and an upper deck UD. A cargo hold 74 is separated from the main deck MD by a floor 72. The main deck MD is separated from the upper deck UD by a floor 73. A container 75 according to the invention is positioned on the cargo deck CD. The container has two sections, each can be covered at its top by a respective roll top 76 and 76A. Two pantrys 77 and 78 are arranged on the upper floor 73 in the upper deck UD. A vertical conveyor 79 connects the pantry 77 with the left-hand portion of the container 75. A vertical conveyor 80 connects the pantry 78 with the right-hand portion of the container 75.

Two horizontal transport channels 4 and 4A are installed below the upper floor 73. The transport channel 4 cooperates with the vertical conveyor 79. The transport channel 4A cooperates with the vertical conveyor 80. As can be seen, the horizontal channels 4 and 4A are substantially flat in cross-section, that is to say they are less tall than they are wide.

In FIG. 17, the right-hand portion of the container is filled, but already opened by the roller cover 76 that is stored in a slot in the upright wall of the container 75. The left-hand portion of the container 75 has already been partially emptied and the roller cover 76A is also held in a vertical slot of the respective vertical wall of the container 75.

Thus, these roller covers 76, 76A can open one container portion at a time or both portions simultaneously.

An unloading robot 81 with a gripper 81A, for example a suction gripper, is movably mounted in the floor 72 of the main deck MD. The robot 81 is displaceable horizontally in the crosswise and lengthwise direction for picking up the boxes inside the container 75. The gripper 81A transfers a box to an input unit 82 of the vertical conveyor 79. Similarly, an input unit 84 receives boxes from a further robot unit 83. If necessary, both robot units 81 and 83 can function simultaneously. Batteries 85 and 86, for example of heating cells, preferably microwave ovens, are arranged alongside the vertical conveyors 79 and 80 respectively on the main deck MD. Each heating cell 85, 86 has a door that is closed during operation for safety reasons. If necessary or required, each heating cell 85, 86 can hold one menu box in order to heat the contents to a serving temperature in about 2.5 minutes.

One trolley 13 is arranged in the viewing direction behind each of the vertical conveyors or lifts 79, 80. The vertical conveyors 79 and 80 or the heating cells 85, 86 then provide the menu boxes 6 for filling the trolleys. Preferably, a feeding unit 14 as shown in FIG. 12 is provided for this purpose to feed the boxes 60 into the respective trolley. Two further feeder units 14 may be provided in order to feed menu boxes from the vertical conveyors 78 and 90 into the heating cells or ovens 85, 86 and for removing the warmed up boxes from these heating cells back into the respective vertical conveyor.

Another embodiment of the heating cells 85, 86 may be so constructed that each cell comprises two doors, one for inserting a box to be heated and one for removing a heated box on the side opposite to the feed-in door. Such an arrangement can greatly accelerate the handling of the boxes.

With the above described structural features, the present system can perform the following functions. First, the serving of cold meals and cold beverages will be described.

Robots 81 and 82 withdraw menu boxes 60 and beverage boxes 21 containing cold meals and cold beverages respectively from the container 75 and feed these boxes to the feeder units 82, 84 to supply the boxes into the respective vertical conveyor or lift 79, 80. If a passenger on the main deck MD is to receive the retrieved box, such box is transported by the vertical conveyor 80 to the transport channel 4A which in turn feeds the box in the longitudinal direction of the aircraft body to that pantry which is closest to the seat of the particular passenger. In the pantry the box is transferred into a respective trolley 13 by a feeder unit 14 as described, whereupon the flight attendant transports the trolley with the cold meal box to the passenger. The cooling of the food and beverage in the box is assured in that the container 75 is kept at the required temperature during flight. For this purpose the container 75 is provided with connections to a cooling unit which feeds air of the desired temperature through the container 75 or at least through a portion of the container 75 holding cold meals.

The serving of hot meals and hot beverages will now be described. The functional sequence is similar as described above, however the serving of a hot meal to a passenger on the upper deck UD will now be described. The unloading robot 81 grips a respective hot meal menu box 60 and transfers it to the feeder unit 82 which in turn feeds the box into the vertical conveyor or lift 79. The vertical lift transfers the box 60 to the transport channel 4 which again feeds the box in the longitudinal direction of the aircraft body to the pantry closest to the particular seat.

However, now the menu box 60 is not placed into a trolley 13, rather the box is first placed into a respective heating cell for a fixed time. When that time period has ended, the box is removed from the heating cell and then inserted into a trolley, whereupon it is delivered to the passenger by a flight attendant. The handling of a single box has been described. However, the trolleys will hold a complete set of boxes. In fact, the trolleys may contain hot meals and cold beverages simultaneously.

The entire system is electronically controlled, whereby certain phases, for example, the operation of the belts in the transport channels and the operation of the vertical conveyors or lifts can take place substantially automatically, while certain functions are caused manually by a flight attendant operating a respective key or switch on a control panel in the pantry or pantries.

Although the invention has been described with reference to specific example embodiments, it will be appreciated that it is intended to cover all modifications and equivalents within the scope of the appended claims.

What I claim is:

1. An apparatus for handling food and beverages on board an aircraft, comprising a container for storing a plurality of food and beverage boxes, at least one distribution station, and a transport channel for directly and independently transporting said boxes operatively interposed between said container and said distribution station, wherein said transport channel comprises at least one vertical conveyor and a substantially horizontally extending channel having a substantially flat cross-sectional configuration with a relatively greater horizontal channel width and a relatively smaller vertical channel height, and wherein said food and beverage boxes are substantially flat boxes having a relatively greater horizontal box width and a relatively smaller vertical box height.

2. The apparatus of claim 1, further comprising a controllable box unloading robot device (5, 81, 83) positioned for retrieving boxes from said transport channel.

3. The apparatus of claim 1, wherein said transport channel (4) further comprises at least one feeder terminal (6) positioned relative to said container (1) for feeding boxes from said container into said transport channel (4).

4. The apparatus of claim 1, wherein said container (1) comprises a roller-top cover (76) for closing an upwardly facing side of said container (1).

5. The apparatus of claim 3, wherein said feeder terminal (6) comprises a conveyor belt (55) and a driven member (56) for advancing said conveyor belt (55).

6. The apparatus of claim 1, wherein said substantially horizontally extending channel of said transport channel comprises a plurality of channel sections (9), each said channel section comprises a conveyor belt (20) supported by individual rollers (23), and flange connectors (10, 10A) interconnecting neighboring ones of said channel sections (9).

7. The apparatus of claim 6, wherein each said channel section (9) comprises at least one electromotor and at least two of said rollers (23) supporting said conveyor belt (20), and wherein said electromotor is connected to one of said at least two rollers (23) for driving said conveyor belt (20).

8. The apparatus of claim 1, wherein said horizontally extending channel of said transport channel (4) further comprises at least one elbow channel section (25) including a housing (32), a cross-channel (26) and a longitudinal channel (27), said elbow channel section interconnects said cross-channel (26) and said longitudinal channel (27) in said housing (32) substantially at a right angle, said elbow channel section further comprises within said housing (32) a tiltable plate (33) and rotatably driven conveyor rollers (36, 37) rotatably mounted in said tiltable plate, and said conveyor rollers (36, 37) have axes extending approximately perpendicularly to each other.

9. The apparatus of claim 1, wherein said vertical conveyor (18) comprises two oppositely driven vertical conveyor belts (42, 43), and each of said conveyor belts comprise a plurality of shelves (44) extending crosswise to the longitudinal direction of said vertical conveyor belts.

10. The apparatus of claim 3, wherein said feeder terminal (6) comprises a driveable conveyor belt (55) and a feed-in passage (54) that is adapted for connection to said container to receive boxes from said container.

11. The apparatus of claim 1, wherein said distribution station comprises a pantry (7), a box transfer unit (14) in said pantry, said box transfer unit (14) comprising a horizontal telescoping arm (57) having a gripper (57C, 57D), said telescoping arm (57) being extendable in a horizontal direction, said transfer unit (14) further comprising a vertical shaft (58), a carriage (58A) guided for vertical movement by said vertical shaft, said telescoping arm being mounted to said carriage for a vertical up and down movement with said carriage, and a vertical drive unit (M, 59) for said carriage.

12. The apparatus of claim 1, wherein said transport channel (4) further comprises at least one box lifter unit (61) comprising two vertically displaceable lifting platforms (62, 63) for lifting boxes to a level for removal out of said transport channel (4).

13. The apparatus of claim 1, further comprising a carrier plate (68) for holding a plurality of boxes each having a fractional smaller size than a standard sized box.

14. The apparatus of claim 1, wherein said food and beverage boxes (2, 60) are made of synthetic plastics material for reuse.

15. The apparatus of claim 1, further comprising at least one battery (85, 86) of heating cells for heating said boxes prior to distribution of said boxes.

16. The apparatus of claim 15, wherein said heating cells comprise microwave ovens arranged as part of said distribution station.

17. The apparatus of claim 15, wherein each heating cell has a door for opening the heating cell to place at least one of said boxes into said heating cell.

18. The apparatus of claim 15, wherein each heating cell comprises a first door for insertion of at least one box and a second door for removal of said box.

19. The apparatus of claim 1, wherein at least some of said boxes are each dimensioned to contain food items for only one individual meal.

20. The apparatus of claim 1, wherein at least some of said boxes comprise a box bottom in the form of a food service tray and a box top in the form of a lid arranged to selectively cover and uncover said tray.

21. The apparatus of claim 1, wherein said food and beverage boxes include boxes dimensioned in at least one standardized size selected from the group consisting of a first size defining a first volume able to contain at most three standard 0.75 liter wine bottles lying side-by-side in said box, a second size having a second volume equal to one half of said first volume, a third size having a third volume equal to one quarter of said first volume, and a fourth size having a fourth volume equal to one eighth of said first volume.

22. The apparatus of claim 1, wherein said boxes are stacked in a plurality of layers of boxes directly on top of one another in said container.

23. The apparatus of claim 1, wherein said transport channel is configured to transport individual packets of said boxes in a substantially horizontal orientation, wherein each packet comprises from a single one of said boxes up to eight of said boxes grouped together.

24. The apparatus of claim 1, further comprising a food service trolley arranged at all times externally and separately from said transport channel and adapted to cooperate with said distribution station to receive into said trolley a plurality of said boxes in a substantially horizontal orientation.

25. The apparatus of claim 1, wherein said container has the outer configuration of a standard freight container and is centrally arranged in a freight compartment of said aircraft.

26. An apparatus for handling food and beverages on board an aircraft, comprising a centrally arranged container having the outer configurations of a freight container for storing food and beverage boxes, at least one distribution station, and a transport channel operatively interposed between said container and said distribution station, wherein said transport channel comprises at least one vertical conveyor and at least one elbow channel section including a housing, a cross-channel and a longitudinal channel, wherein said elbow channel section interconnects said cross-channel and said longitudinal channel in said housing substantially at a right angle, said elbow channel section further comprises within said housing a tiltable 13 plate and rotatably driven conveyor rollers rotatably mounted in said tiltable plate, and said conveyor rollers have axes extending approximately perpendicularly to each other.

27. An apparatus for handling food and beverages on board an aircraft, comprising a centrally arranged container having the outer configurations of a freight container for storing food and beverage boxes, at least one distribution station, and a transport channel operatively interposed between said container and said distribution station, wherein said transport channel comprises at least one vertical conveyor, and wherein said distribution station comprises a pantry and a box transfer unit in said pantry, wherein said box transfer unit comprises a vertical shaft, a carriage guided for vertical movement by said vertical shaft, a vertical drive unit for said carriage, and a horizontal telescoping arm being horizontally extendable, being mounted to said carriage for a vertical up and down movement with said carriage, and having a gripper mounted thereon.

* * * * *